A. E. SEIBERT.
EXTENSION STEPS FOR RAILWAY CARS AND THE LIKE.
APPLICATION FILED MAR. 13, 1918.
1,280,562.
Patented Oct. 1, 1918.
2 SHEETS—SHEET 1.
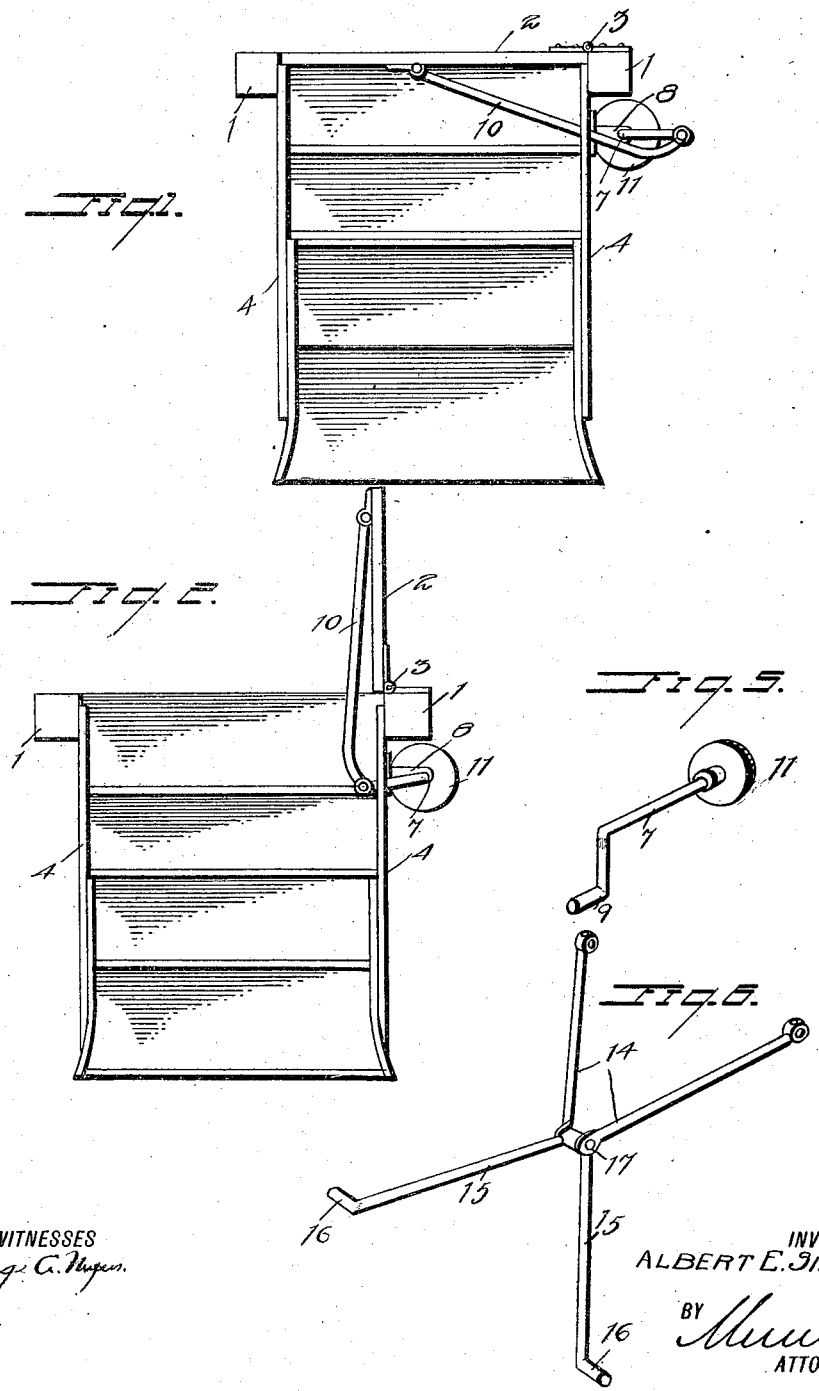
WITNESSES
INVENTOR
ALBERT E. SIEBERT,
BY
ATTORNEYS A. E. SEIBERT.
EXTENSION STEPS FOR RAILWAY CARS AND THE LIKE.
APPLICATION FILED MAR. 13, 1918.
1,280,562.
Patented Oct. 1, 1918.
2 SHEETS—SHEET 2.
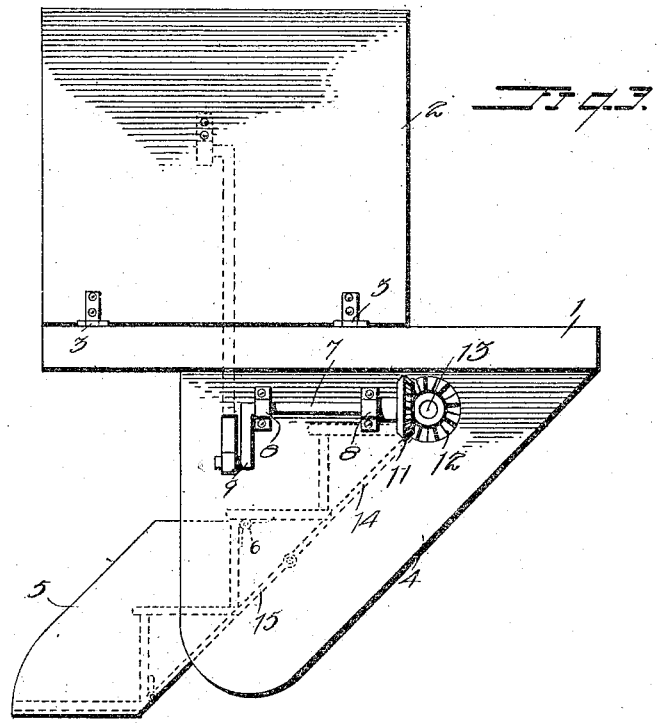
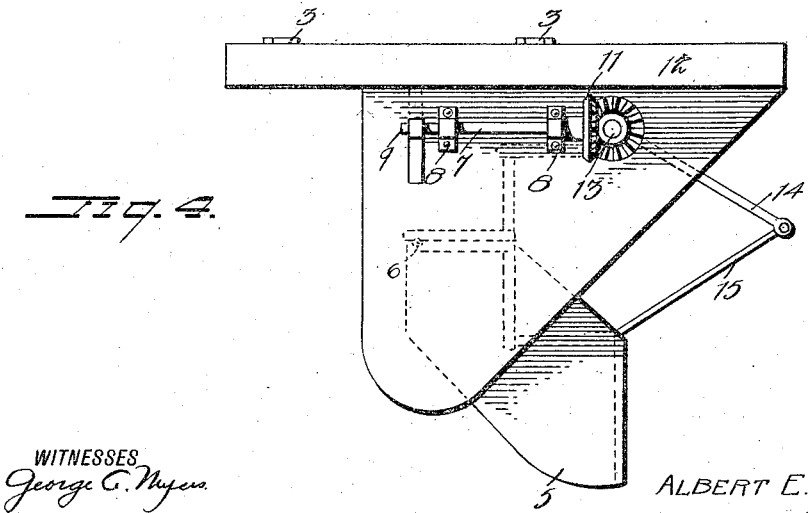
WITNESSES
George C. Myers.
INVENTOR
ALBERT E. SIEBERT,
BY
ATTORNEYS

UNITED STATES PATENT OFFICE.

ALBERT EDWARD SEIBERT, OF CARSON CITY, MICHIGAN.

EXTENSION-STEPS FOR RAILWAY-CARS AND THE LIKE.

1,280,562.  Specification of Letters Patent.  Patented Oct. 1, 1918.

Application filed March 13, 1918. Serial No. 222,138.

*To all whom it may concern:*

Be it known that I, ALBERT EDWARD SEIBERT, a citizen of the United States, and a resident of Carson City, in the county of Montcalm and State of Michigan, have invented certain new and useful Improvements in Extension-Steps for Railway-Cars and the like, of which the following is a specification.

My invention is an improvement in extension steps for railway cars and the like, and has for its object to provide a step of the character specified, which may be cheaply made and installed, and which will take up comparatively little space when in folded position, so that the desired clearance of the steps relative to the road bed is provided, and which is moved into operative position by the lifting of the trap in the vestibule floor.

In the drawings:

Figure 1 is a front view of the improved step, with the trap lowered;

Fig. 2 is a similar view with the trap lifted;

Fig. 3 is a side view with the trap lifted;

Fig. 4 is a similar view with the trap lowered;

Fig. 5 is a perspective view of the crank shaft;

Fig. 6 is a similar view of the connection between the step and the shaft.

The present embodiment of the invention is shown in connection with the platform 1 of a railway car, and the extension step is adapted to be moved into and out of operative position by the swinging of the trap 2, which is hinged to the platform, as indicated at 3, in the usual manner. The usual steps 4, which are two in number, have hinged to the bottom thereof an extension step 5 consisting of two steps, the extension steps being hinged to the fixed step, as indicated at 6, to swing into the position of Fig. 4 or into the position of Fig. 3.

When in the position of Fig. 4, the extension step is beneath the fixed steps and out of operative position, while when in the position of Fig. 5 the extension steps form a continuation of the fixed steps so arranged that the passengers may step directly from the extension steps to the platform or the ground without the necessity of a foot stool or the like.

A crank shaft 7 is journaled in bearings 8 on the side of the fixed step, and the crank 9 of the crank shaft is connected by a link 10 with the trap 2 in such manner that when the trap is swung into or out of closed position the shaft 7 will be rotated. A bevel gear wheel 11 is secured to the opposite end of the shaft from the crank, and this gear meshes with a similar gear 12 on a shaft 13 journaled transversely of the fixed steps at the top thereof.

This shaft 13 has rigid therewith arms 14, and the free end of each arm is connected by a link 15 with the extension step. The connection between the arms 14 and the links 15 is a pivotal connection, and each link 15 has at the end remote from the arm 14 an outwardly extending journal pin 16 which is journaled on the extension step. The links 15 converge toward the pivotal connection 17 with the arms 14, and the arms 14 also converge toward this pivotal connection, as shown in Fig. 6.

In use, whenever the trap is lifted to give access to the vestibule, the extension step will be moved into operative position, and when the trap is lowered to close the vestibule the extension step will be moved into inoperative position.

I claim:

The combination with a railway car platform, the stationary steps and the trap normally closing access to the steps, of a pair of extension steps hinged to the lowermost of the stationary steps and arranged to swing inwardly beneath the lowermost of the stationary steps to form a continuation of the stationary steps, a crank shaft journaled to the stationary steps, a link connecting the trap with the crank of the shaft for oscillating the shaft when the shaft is raised and lowered, a second shaft journaled at right angles to the crank shaft and having a radial arm, and a link connecting the said arm to the extension steps.

ALBERT EDWARD SEIBERT.

Witnesses:
. H. E. COWDIN,
PAUL V. BRETZ.

Copies of this patent may be obtained for five cents each, by addressing the "Commissioner of Patents, Washington, D. C."